June 1, 1965 L. C. CHOUINGS 3,186,521
AUTOMATIC ADJUSTING DEVICES FOR BRAKE ACTUATING MECHANISMS
Filed Dec. 26, 1962 3 Sheets-Sheet 1

INVENTOR
Leslie C. Chouings
BY
Lawrence J. Winter
ATTORNEY

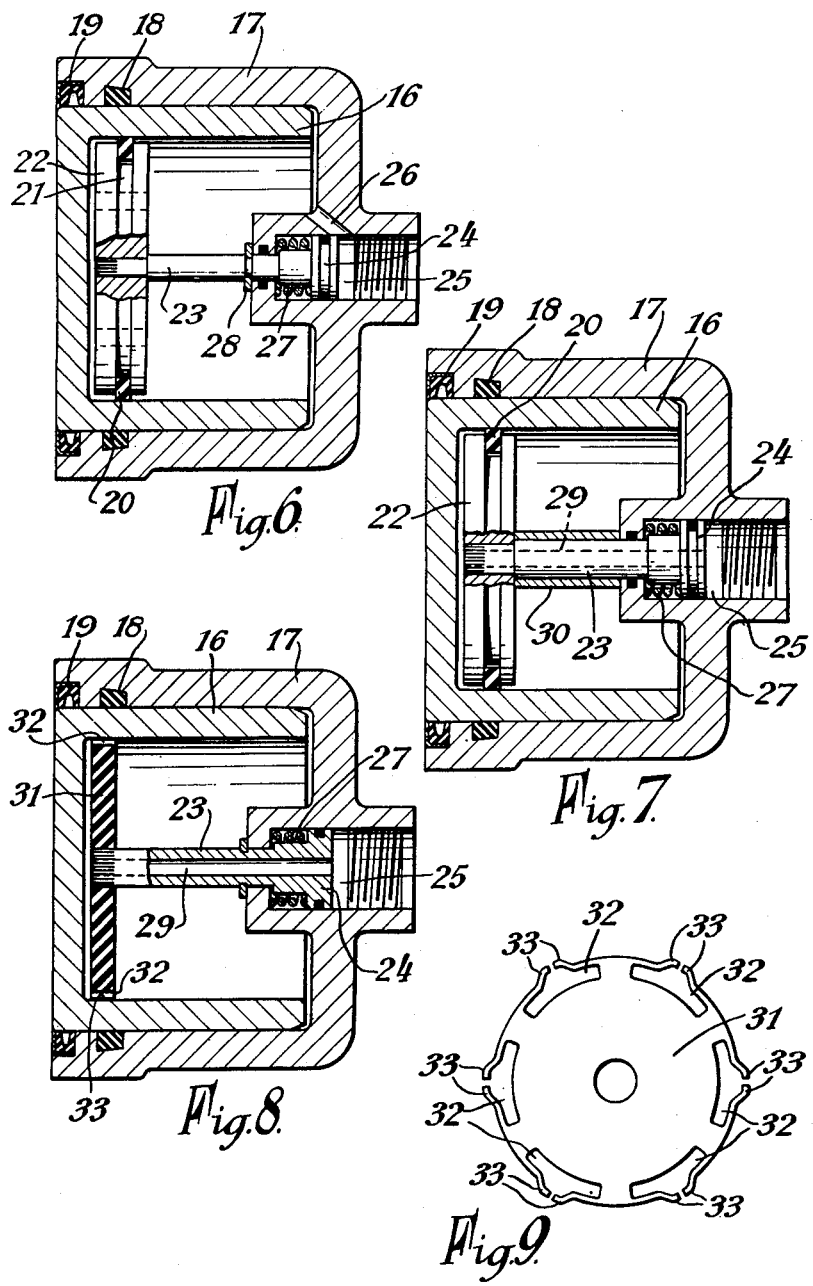

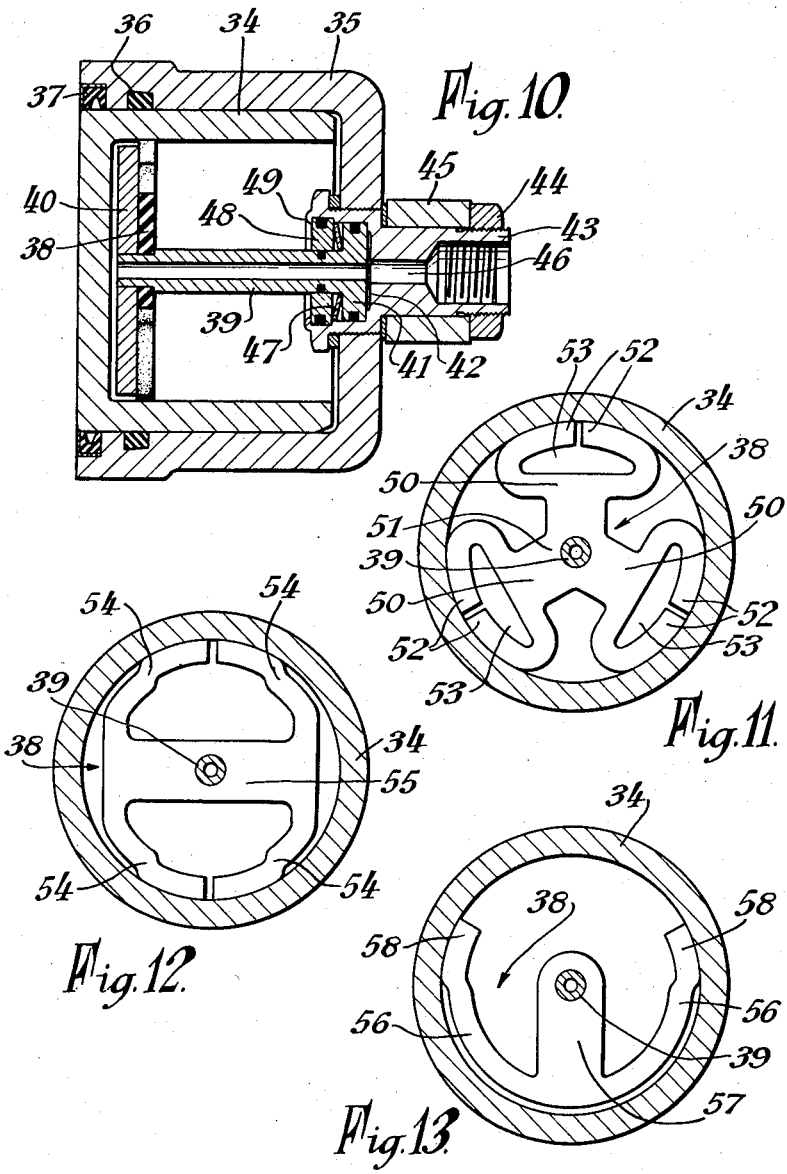

United States Patent Office 3,186,521
Patented June 1, 1965

3,186,521
AUTOMATIC ADJUSTING DEVICES FOR BRAKE ACTUATING MECHANISMS
Leslie C. Chouings, Leamington Spa, England, assignor to Automotive Products Company Limited, Leamington Spa, England
Filed Dec. 26, 1962, Ser. No. 247,183
Claims priority, application Great Britain, Dec. 28, 1961, 46,509
1 Claim. (Cl. 188—196)

This invention relates to a device for automatically adjusting the position relative to one another, of a piston and cylinder or other telescopic members (hereinafter referred to for clarity as a piston and cylinder) of a fluid pressure operated brake actuating mechanism so that upon release of the brake a substantially constant clearance can be maintained between one or the other of said members and a member, for example the brake pad of a disc brake, actuated thereby.

It has already been proposed to provide automatically operating adjusting devices for the purpose set out above in which a friction member operatively associated with either the piston or cylinder is provided to maintain the piston and cylinder in the relatively adjusted positions. In such prior adjusting devices the arrangement is such that upon movement of the piston or cylinder under the action of pressure fluid acting between them, the friction member moves with the moving member against the action of resilient means urging both members to the retracted position, the moving member being either movable relative to the friction member, or jointly therewith, to take up any additional clearance over the normal working stroke to provide the required adjustment.

It will be appreciated that the adjustment obtained with the present invention takes into account not only the travel of the piston or cylinder, in relation to the working stroke, due to wear of the friction elements of the brake, but also any mechanical deflection of the brake mechanism directly associated with the piston and cylinder. For example in a fluid pressure operated disc brake having a caliper of the well known "saddle" construction, spreading of the caliper limbs occurs when the brake is applied, thus with existing constructions of automatic adjusting device, the adjustment obtained is affected by the amount of spreading.

The present invention has therefore for its object to provide an automatic adjusting device which operates to compensate for wear of the friction elements alone, so that the adjustment obtained is unaffected by any mechanical deflection in the brake actuating mechanism.

The automatic adjusting device of the present invention also utilizes a friction member for maintaining the piston and cylinder in the adjusted position, and resilient means for returning the piston or cylinder to the retracted position, but in accordance with the invention, the displacement of the friction member is effected independently of movement of the piston or cylinder during a working stroke, so that the amount of movement of the friction member is not subject to any relative movement of the piston and cylinder resulting from mechanical deflection of the brake mechanism directly associated with the piston and cylinder.

According to the invention, in an automatic adjusting device for the piston and cylinder of a fluid pressure operated brake actuating mechanism, a friction member is provided for maintaining said piston and cylinder in the relatively adjusted positions, and resilient means for urging said friction member to a retracted position, thereby determining the retracted position for the piston and cylinder, said friction member and resilient means being arranged so that pressure fluid admitted to the cylinder results in axial displacement of the friction member to overcome the action of the resilient member, and subsequently to effect displacement of the cylinder or piston relative to the friction member to effect braking, release of the brake permitting the friction member, piston and cylinder to move jointly until the fluid pressure in the cylinder is such as to permit the resilient means to return the friction member to its retracted position, together with the piston or cylinder. The friction member may be arranged to frictionally engage either the piston or the cylinder, or an intermediate member operatively associated with either one of such members. Further, the pressure fluid can act directly on the friction member to effect the axial displacement thereof or on a member operatively associated with the friction member. Similarly the resilient means, consisting, for example, of any suitable form of spring, may act directly on the friction member or on a member operatively associated with the friction member.

It is not necessary that the friction member and the piston move axially the same distance in the present invention, since the piston does not move at first whereas the friction member does. In this case the piston and friction member can move axially the same distance. However, it is also possible that the piston move axially a further distance than the friction member. In this case, the resilient means operatively connected with the friction member will return the piston a predetermined distance to its retracted position, which does not necessarily have to be the original axial distance the piston moved since there can be some wear on the brake pads associated with the piston.

The automatic adjusting means of the present invention is particularly suitable for incorporation in the wheel cylinders of fluid pressure operating disc brakes and accordingly embodiments of the invention applied to such wheel cylinders will now be described by way of example by aid of the accompanying diagrammatic drawings in which.

Figure 1:
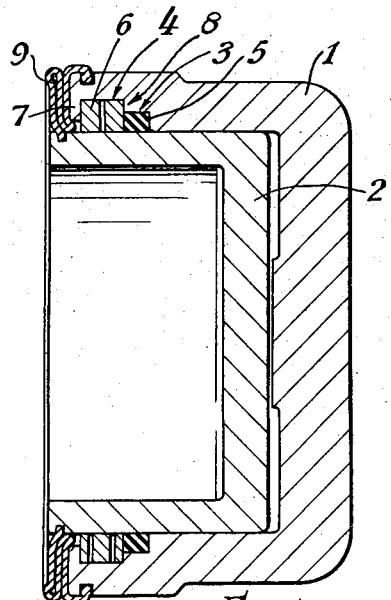
FIGURE 1 shows in longitudinal section a wheel cylinder incorporating automatic adjusting means according to one embodiment of the invention.

FIGURES 6 to 8 also show in longitudinal section wheel cylinders incorporating automatic adjusting means according to still further embodiments of the invention;

FIGURE 9 is a view of a friction member suitable for use in any one of the embodiments of FIGURES 6 to 8.

FIGURE 10 shows in longitudinal section a wheel cylinder incorporating automatic adjusting means according to another embodiment of the invention; and FIGURES 11 to 13 show alternative forms of friction members particularly suitable for use in the construction according to FIGURE 10.

In each of the embodiments of the invention now to be described it will be assumed that the cylinder is fixed and the piston movable relative thereto by the admission of pressure fluid to the cylinder.

Referring to the drawings, in each of the embodiments shown in FIGURES 1 to 5, the wheel cylinder in each case comprises a cylinder 1 and a piston 2. The cylinder is provided with the usual pressure fluid port (not shown) for connecting the cylinder to the fluid circuit of the braking system and a breather port, also not shown. The piston 2 is hollow and closed at one end and arranged in the cylinder with its closed end innermost.

The bore of the cylinder 1 is stepped for a portion of its length extending inwardly from the outer end thereof, the stepped diameters providing with the outer periphery of the piston a first annular recess 3 and a second annular recess 4 of larger diameter than the former, the two recesses being open to one another at their adjacent sides with the recess 4 of larger diameter outboard. The recess 3 of smaller diameter receives a sealing member 5 providing a ring of friction material of rectangular cross section which embraces the piston 2. The larger diameter recess 4 receives a compression spring 6 the outer end of which, in the normally expanded condition of the spring, bears against a shoulder 7 at the outer end of the large diameter recess 4, the inner end of the spring bearing against the shoulder 8 provided by the inner end of the large diameter recess 4, the inner end of the spring 6 facing the adjacent outer face of the ring of friction material. The arrangement is such that when the brakes are actuated, the admission of pressure fluid to the cylinder 1, the pressure of which at first is insufficient to cause movement of the piston, acts between the inner end of the small daimeter annular recess 3 and the inner side of the ring of friction material or sealing member 5 with the result that the ring 5 is displaced axially in the outward direction and relative to the piston 2 and cylinder 1, so that the ring engages the spring 6 to compress the same, the axial movement continuing until the spring is fully compressed. As the pressure in the cylinder 1 rises, the piston 2 moves outwardly under the pressure fluid, the piston sliding through the ring of friction material or sealing member 5 to apply the brake pad to the brake disc. Upon release of the brakes the wheel cylinder will move as a whole with the supporting caliper and upon any contraction thereof resulting from deflection of the caliper under the braking force. When, however, the pressure of the fluid in the cylinder drops sufficiently to permit the compression spring to expand, the friction ring 5 is pushed inwardly carrying the piston with it, the movement continuing until the spring reaches its expanded condition. A sealing member 9 prevents the ingress of dirt or other foreign matter at the outer end of the cylinder.

The constructions of the embodiments shown in FIGURES 2 to 5 of the accompanying drawings are substantially identical with that of FIGURE 1 and accordingly where possible the same reference numerals are used to indicate corresponding parts.

Figure 2:
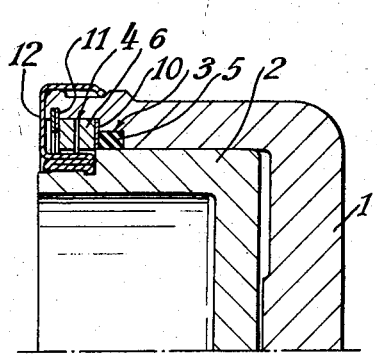
FIGURES 2 to 5 show in longitudinal section wheel cylinders incorporating automatic adjusting means according to further embodiments of the invention.
Figure 3:
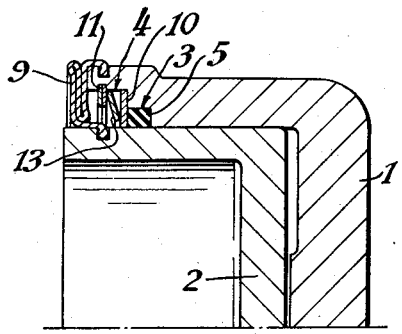
Figure 5:
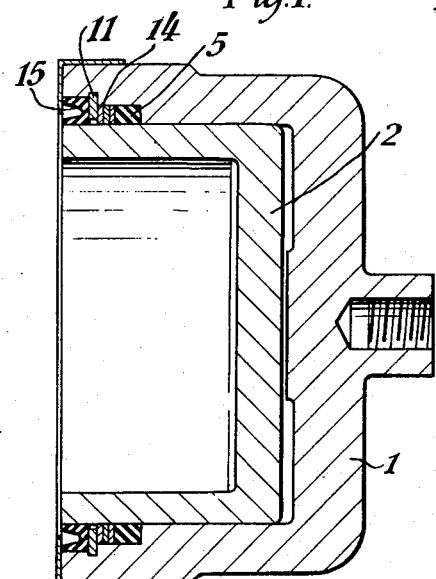
Figure 4:
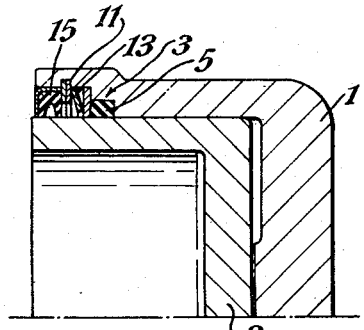

In the construction shown in FIGURE 2 a washer 10 is disposed between the adjacent faces of the helical spring 6 and sealing member 5, the opposite or outboard end of the spring bearing against an internal type spring retaining ring 11 which replaces the shoulder 7 shown in FIGURE 1. A modified form of end sealing member 12 is also provided in this particular construction. The construction shown in FIGURE 3 utilizes a "Belleville" washer 13 as the spring member. Otherwise this construction is substantially identical with that disclosed in connection with FIGURE 2. In the construciton shown in FIGURE 4 a "Belleville" washer 13 is also used as the spring member. In the embodiment of the invention shown in FIGURE 5 the compression spring is provided by a spring 14 having flat closely wound coils. The use of a "Belleville" washer as shown in FIGURES 3 and 4 or the use of a flat coil spring of FIGURE 5 enables the axial length of the annular recess 4 to be reduced. The constructions of FIGURES 4 and 5 also incorporate a lip type seal 15 at the outer end of the cylinder instead of the diaphragm or bellows type shown in FIGURES 1 to 3.

In FIGURES 6 to 10 of the drawings embodiments of the invention are disclosed wherein the friction member is disposed within the piston, the resilient means acting on a member operatively associated wtih the friction member.

According to the further embodiment of the invention shown in FIGURE 6, the piston 16 of the wheel cylinder is hollow and closed at one end and arranged in the cylinder 17 with its closed end outermost. A seal 18 is provided between the piston and cylinder to prevent the leakage of pressure fluid from the outer end of the cylinder and a lip type seal 19 at the outer end of the cylinder prevents the ingress of foreign matter. Disposed within the bore of the piston 16 is a friction member 20 in the form of a ring of friction material, the periphery of which is in contact with the surrounding interior wall of the hollow piston. The friction member is disposed in an annular groove 21 in an apertured disc 22 carried on the outer end of a rod 23 extending axially into the piston. The rod 23 has an enlarged diameter portion at its opposite end which forms an auxiliary piston 24 slidable in a small diameter chamber 25 formed integral with the cylinder 17 and centrally thereof. The bore of the chamber is internally threaded for a portion of its length to receive a pipe coupling for connecting to the fluid circuit of the brake, the chamber 25 and cylinder 17 communicating with one another through a passage or passages 26. The auxiliary piston 24 is spring loaded by a helical compression spring 27, the spring action tending to urge the auxiliary piston outwardly of the chamber, the axial displacement being limited by a shoulder 28 provided by a spring retaining ring on the rod 23, the shoulder being engageable with the opposite inner end of the small diameter chamber. The shoulder 28 thus forms a stop locating the friction member in its retracted position. The arrangement is such that when the brakes are actuated the pressure fluid is admitted to the wheel cylinder through the chamber 25 and passages 26, the pressure fluid acting on the piston 16 resulting in axial movement of the piston which carries the auxiliary piston assembly to the left (FIGURE 6), against the spring loading. As the pressure in the cylinder 17 increases, the piston 16 moves outwardly under the action of the pressure fluid in the normal manner to apply the brake pads to the brake disc. Upon release of the brakes the wheel cylinder will move as a whole with the supporting caliper and upon any contraction thereof resulting from deflection of the caliper under the braking force. When, however, the pressure of the fluid in the wheel cylinder drops sufficiently to permit the spring loading to move the small diameter piston to its retracted position, the piston of the wheel cylinder will be pulled inwardly of the cylinder by the friction member 20.

The construction of the embodiment shown in FIGURE 7 of the drawings is similar in many respects to that shown in FIGURE 6 and accordingly the same reference numerals are used to indicate corresponding parts. However in this particular construction, the passage or passages 26 of the construction above described are dispensed with, the rod 23 being tubular, the bore of the rod thus providing a passage 29 for the flow of pressure fluid between the chamber 25 and cylinder 17. Also in this construction, the stop locating the friction member in the retracted position is provided by an end of a sleeve 30 surrounding the tubular rod 23.

In the embodiment of the invention shown in FIGURE 8 of the drawings the construction incorporates a combination of the features of FIGURES 6 and 7 but differs from both in that the friction member 31 is provided by a disc of friction material formed as shown in FIGURE 9. As shown the disc 31 is provided with a plurality of apertures 32 adjacent the peripheral edge and equally spaced therearound the radially outer edge of each aperture being split, the divided portions extending outwardly of the disc periphery so that such periphery is interrupted at spaced points and provided at each said point with flexible tongues 33 which resiliently engage the bore of the hollow piston when inserted therein.

In the embodiment of the invention shown in FIGURE 10 of the drawings, the piston 34 of the wheel cylinder is hollow and closed at one end and arranged in the cylinder 35 with its closed end outermost. A seal 36 is provided between the cylinder bore and piston to prevent leakage of pressure fluid from the outer end of the cylinder and a lip type seal 37 is provided at the outer end of the cylinder to prevent dirt or other foreign matter entering the cylinder. Disposed within the bore of the piston 34 is a friction member 38 in the form of a spider made from friction material, the radially outer ends of the spider arms as hereinafter described, providing surfaces in frictional contact with the surrounding interior wall of the hollow piston. The friction member is carried by one end of a tubular rod 39 to which it is secured by clamping between a shoulder on the rod and a clamping plate 40. The tubular rod 39 has an enlarged diameter portion at its end opposite to the friction member which forms an auxiliary piston 41 slidable in a chamber 42 formed in a bush 43 screwed into a tapped hole in the closed end of the cylinder 35. The bush is secured by a lock-nut 44 screwed onto the outer end of the bush which projects outwardly of the cylinder, a distance piece 45 being provided between the lock-nut and cylinder end. The bush 43 is adapted for coupling to the fluid circuit of the brake system, the bore 46 of the bush and the bore of the tubular rod being in line with one another to provide a passage for the admission of pressure fluid from the fluid circuit to the cylinder 35. The auxiliary piston 41 is spring loaded by a "Belleville" washer 47 disposed between one face of the auxiliary piston 41 and an annular plug 48 secured axially in the chamber 42 between a shoulder and a peened over edge 49. The operation of the automatic adjuster of this embodiment is as described in connection with the embodiment of FIGURE 6.

The spider forming the friction member 38 can be formed as shown for example in any one of FIGURES 11 to 13. In the construction shown in FIGURE 11, the friction member 38 consists of a spider having three arms 50 extending radially from a central portion 51. The outer end 52 of each arm is enlarged and has an aperture 53 the radially outer edge of each arm being split and formed to provide a peripheral surface for frictional contact with the surrounding wall of the piston interior. In the construction of FIGURE 12 the friction member 38 is also in the form of a spider having four arms 54 the said arms extending outwardly from a central portion 55 the outer ends of each arm being formed to provide the peripheral surfaces in frictional contact with the surrounding wall of the interior of the hollow piston 34. FIGURE 13 shows a friction member 38 in the form of a spider having two arms 56 carried by a central portion 57, the outer end 58 of each arm being formed to provide the peripheral surfaces in contact with the surrounding wall of the interior of the hollow piston 34.

A friction member of the kind disclosed in connection with any one of FIGURES 9 or 11 to 13 has the advantage that the same can be constructed so as to have resilience permitting partial collapse thereof and ease the piston reset load. Further the friction device also acts as a backspring device under piston knock back conditions.

I claim:

An automatic adjusting device for the piston and cylinder of a hydraulic fluid pressure operated brake mechanism comprising a cylinder formed of a single integral piece of material with a closed end and an open end, a piston slidably disposed therein, two annular recesses formed on the inner surface of said cylinder being open to each other at their adjacent sides with one recess being of larger diameter disposed toward the open end of said cylinder, a shoulder formed at the outer side of said larger diameter recess, a single sealing ring member disposed in said smaller recess and being rectangular in cross section so as to fill said smaller recess, said ring member being coextensive with said smaller recess, and of uniform constant thickness, the inner and outer radial surfaces of said ring member in contact with and touching said piston and smaller recess bottom respectively, a coiled compression spring disposed in said larger recess with its outer end touching and in contact with said shoulder, and the inner end of the spring touching and in contact with said sealing ring member and said inner end of said ring member being disposed in communication with hydraulic fluid pressure acting against said piston adjacent the closed end of said cylinder, said ring member and piston being disposed in said cylinder for independent axial movement in response to hydraulic fluid pressure acting against said ring member and piston, and chamber means in said cylinder in communication with said ring on the right side thereof and with said piston.

References Cited by the Examiner
UNITED STATES PATENTS

| 2,358,740 | 9/44 | Scott-Iverson | 188—79.5 |
| 2,938,609 | 5/60 | Burnett | 188—196 |
| 3,064,768 | 11/62 | Dotto | 188—196 |
| 3,112,014 | 11/63 | Jeffries | 188—196 |

FOREIGN PATENTS

| 711,405 | 6/54 | Great Britain. |

ARTHUR L. LA POINT, *Primary Examiner.*

ABRAHAM G. STONE, *Examiner.*